United States Patent
Carter

[19]

[11] Patent Number: 6,055,767
[45] Date of Patent: May 2, 2000

[54] FLY SWATTER

[76] Inventor: Tracy D. Carter, 968 W. 850 South, Provo, Utah 84601

[21] Appl. No.: 09/105,451

[22] Filed: Jun. 26, 1998

[51] Int. Cl.⁷ ..................................................... A01M 3/02
[52] U.S. Cl. ............................................................... 43/137
[58] Field of Search ............................... 43/134, 136, 137

[56] References Cited

U.S. PATENT DOCUMENTS

| D. 311,050 | 10/1990 | Lisitza | D22/124 |
|---|---|---|---|
| D. 349,940 | 8/1994 | Blaisdell | D22/124 |
| 1,195,559 | 8/1916 | Clarke | 43/136 |
| 1,195,986 | 8/1916 | Harrison | 43/136 |
| 1,587,898 | 6/1926 | Campbell | 43/136 |
| 1,623,006 | 3/1927 | Hamborg et al. | 43/136 |
| 1,802,774 | 4/1931 | Nixon | 43/136 |
| 1,861,378 | 5/1932 | Bloodgood | 43/136 |
| 1,888,563 | 11/1932 | Nixon | 43/136 |
| 2,015,092 | 9/1935 | Turnquist | 43/137 |
| 2,437,447 | 3/1948 | Tarbell | 43/136 |
| 3,449,856 | 6/1969 | Weaver | 43/136 |
| 4,120,114 | 10/1978 | Little et al. | 43/137 |
| 4,242,828 | 1/1981 | Schurger et al. | 43/137 |
| 4,594,808 | 6/1986 | Rhee | 43/134 |
| 4,617,754 | 10/1986 | Miley | 43/137 |
| 4,653,222 | 3/1987 | Vislosi | 43/137 |
| 4,787,171 | 11/1988 | Dagenais | 43/137 |
| 4,905,408 | 3/1990 | Wu | 43/137 |
| 4,914,855 | 4/1990 | Sherman | 43/136 |
| 5,029,411 | 7/1991 | Keenan | 43/136 |
| 5,095,648 | 3/1992 | Keenan | 43/136 |
| 5,269,092 | 12/1993 | Cobble | 43/137 |
| 5,351,436 | 10/1994 | Spalding et al. | 43/137 |

FOREIGN PATENT DOCUMENTS

| 2047117 | 1/1993 | Canada | 43/137 |
|---|---|---|---|
| WO 86/00195 | 1/1986 | WIPO | 43/134 |

Primary Examiner—Michael J. Carone
Assistant Examiner—Darren W. Ark

[57] ABSTRACT

A fly swatter for killing insects. The device includes an elongate handle member with a substantially planar swatting member extending from said proximal end of said handle member. The swatting member has opposite substantially planar first and second swatting surfaces. Provided on each the swatting surface of the swatting member are a plurality of swatting sheets. The swatting sheets of each plurality of swatting sheets are adhesively coupled to the adjacent swatting sheets its respective plurality.

1 Claim, 2 Drawing Sheets

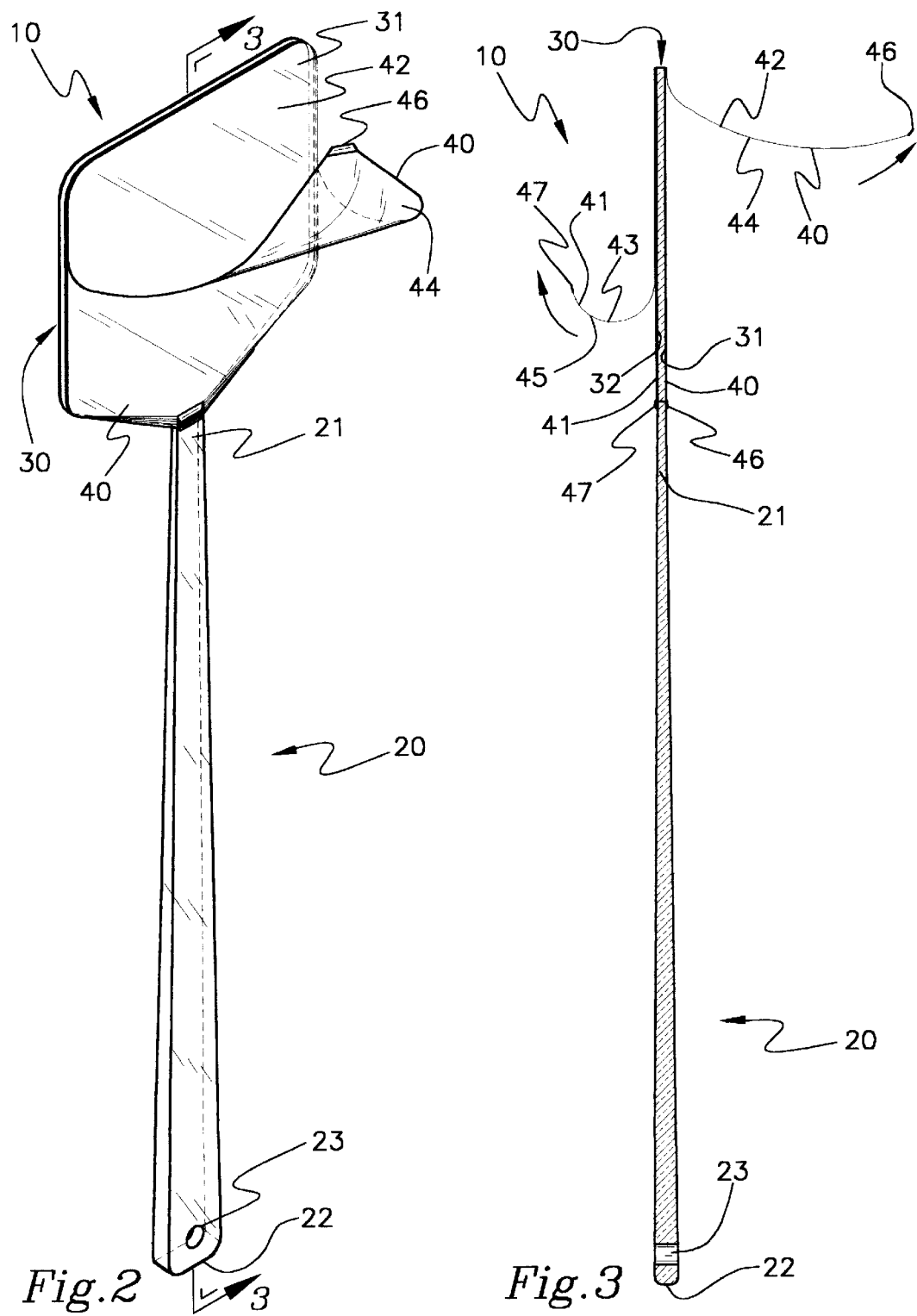

FLY SWATTER

BACKGROUND OF THE INVENTION

1. Field of the Invention

The present invention relates to fly swatters and more particularly pertains to a new fly swatter for killing insects.

2. Description of the Prior Art

The use of fly swatters is known in the prior art. More specifically, fly swatters heretofore devised and utilized are known to consist basically of familiar, expected and obvious structural configurations, notwithstanding the myriad of designs encompassed by the crowded prior art which have been developed for the fulfillment of countless objectives and requirements.

Known prior art fly swatters include U.S. Pat. No. 4,242,828; U.S. Pat. No. 4,617,754; U.S. Pat. No. 4,120,114; U.S. Pat. No. Des. 311,050; U.S. Pat. No. Des. 349,940; and U.S. Pat. No. 5,351,436.

While these devices fulfill their respective, particular objectives and requirements, the aforementioned patents do not disclose a new fly swatter. The inventive device includes an elongate handle member with a substantially planar swatting member extending from said proximal end of said handle member. The swatting member has opposite substantially planar first and second swatting surfaces. Provided on each the swatting surface of the swatting member are a plurality of swatting sheets. The swatting sheets of each plurality of swatting sheets are adhesively coupled to the adjacent swatting sheets its respective plurality.

In these respects, the fly swatter according to the present invention substantially departs from the conventional concepts and designs of the prior art, and in so doing provides an apparatus primarily developed for the purpose of killing insects.

SUMMARY OF THE INVENTION

In view of the foregoing disadvantages inherent in the known types of fly swatters now present in the prior art, the present invention provides a new fly swatter construction wherein the same can be utilized for killing insects.

The general purpose of the present invention, which will be described subsequently in greater detail, is to provide a new fly swatter apparatus and method which has many of the advantages of the fly swatters mentioned heretofore and many novel features that result in a new fly swatter which is not anticipated, rendered obvious, suggested, or even implied by any of the prior art fly swatters, either alone or in any combination thereof.

To attain this, the present invention generally comprises an elongate handle member with a substantially planar swatting member extending from said proximal end of said handle member. The swatting member has opposite substantially planar first and second swatting surfaces. Provided on each the swatting surface of the swatting member are a plurality of swatting sheets. The swatting sheets of each plurality of swatting sheets are adhesively coupled to the adjacent swatting sheets its respective plurality.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fly swatter apparatus and method which has many of the advantages of the fly swatters mentioned heretofore and many novel features that result in a new fly swatter which is not anticipated, rendered obvious, suggested, or even implied by any of the prior art fly swatters, either alone or in any combination thereof.

It is another object of the present invention to provide a new fly swatter which may be easily and efficiently manufactured and marketed.

It is a further object of the present invention to provide a new fly swatter which is of a durable and reliable construction.

An even further object of the present invention is to provide a new fly swatter which is susceptible of a low cost of manufacture with regard to both materials and labor, and which accordingly is then susceptible of low prices of sale to the consuming public, thereby making such fly swatter economically available to the buying public.

Still yet another object of the present invention is to provide a new fly swatter which provides in the apparatuses and methods of the prior art some of the advantages thereof, while simultaneously overcoming some of the disadvantages normally associated therewith.

Still another object of the present invention is to provide a new fly swatter for killing insects.

Yet another object of the present invention is to provide a new fly swatter which includes an elongate handle member with a substantially planar swatting member extending from said proximal end of said handle member. The swatting member has opposite substantially planar first and second swatting surfaces. Provided on each the swatting surface of the swatting member are a plurality of swatting sheets. The swatting sheets of each plurality of swatting sheets are adhesively coupled to the adjacent swatting sheets its respective plurality.

Still yet another object of the present invention is to provide a new fly swatter that is substantially transparent so that it is harder for insects to detect it when a user is swinging the fly swatter at the insects.

Even still another object of the present invention is to provide a new fly swatter that includes removable substantially transparent sheets so that the fly swatter may be kept clean and free of debris, such as dead insects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention with a swatting sheet being peeled off.

FIG. 3 is a schematic cross-sectional view of the present invention taken from line 3—3 on FIG. 2.

DESCRIPTION OF THE PREFERRED EMBODIMENT

Figure 1:
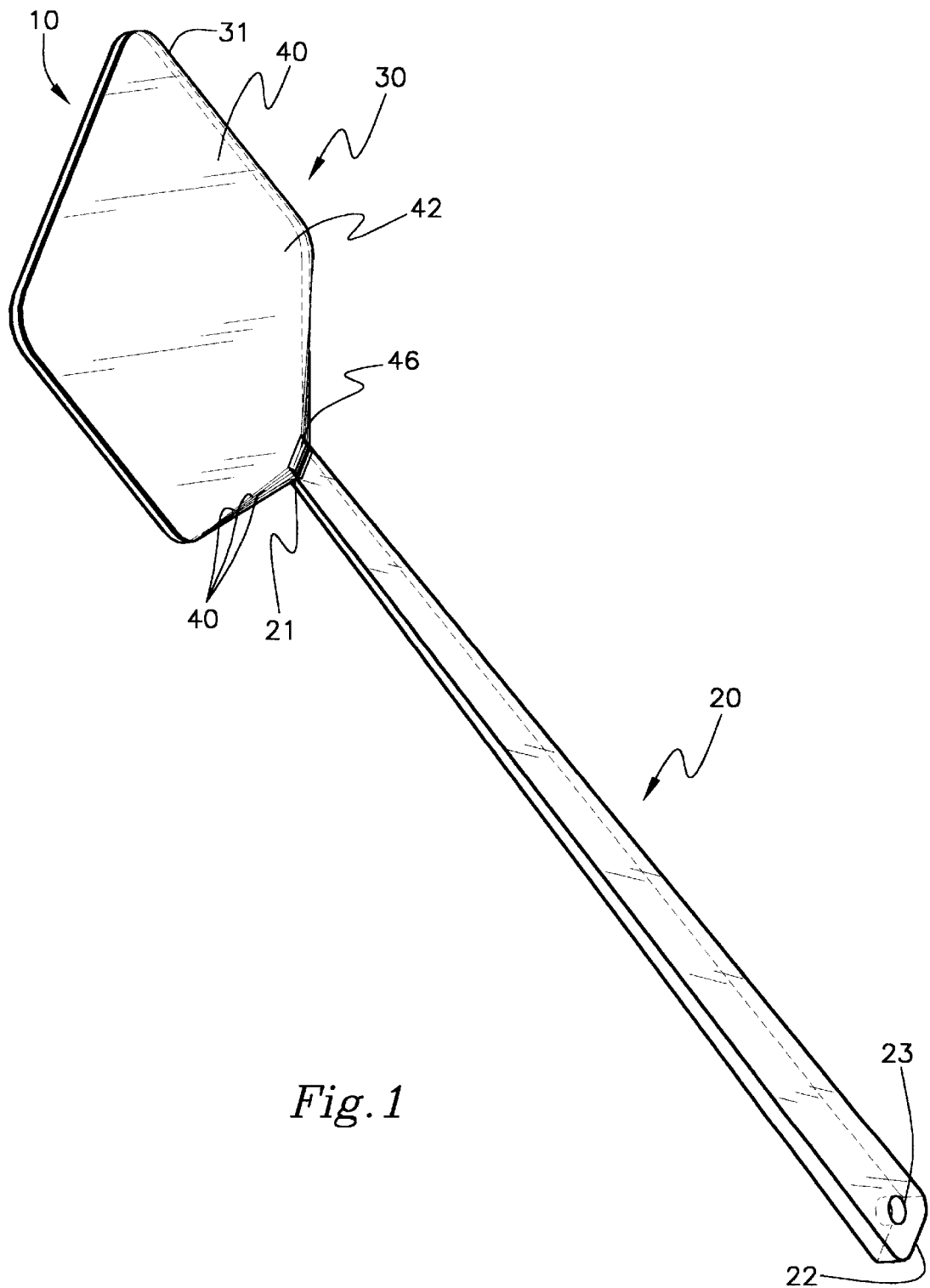
FIG. 1 is a schematic perspective view of a new fly swatter according to the present invention.

With reference now to the drawings, and in particular to FIGS. 1 through 3 thereof, a new fly swatter embodying the principles and concepts of the present invention and generally designated by the reference numeral 10 will be described.

As best illustrated in FIGS. 1 through 3, the fly swatter 10 generally comprises an elongate handle member 20 with a substantially planar swatting member 30 extending from said proximal end 21 of said handle member 20. The swatting member 30 has opposite substantially planar first and second swatting surfaces 31,32. Provided on each the swatting surface 31,32 of the swatting member 30 are a plurality of swatting sheets 40,41. The swatting sheets of each plurality of swatting sheets 40,41 are adhesively coupled to the adjacent swatting sheets its respective plurality.

With reference to FIG. 1, the elongate handle member has opposite proximal and distal ends 21,22. Preferably, the distal end 22 has bore 23 extending through it for permitting hanging of the handle member 20 on a hook (not shown). The swatting member 30 is extended from the proximal end 21 of the handle member 20. Preferably, the handle member 20 and the swatting member 30 are substantially transparent to make it harder for insects to see an approaching fly swatter 10 when in use.

With reference to FIG. 3, the swatting member 30 is substantially planar with substantially planar opposite first and second swatting surfaces 31,32 that are designed for hitting an insect with. Provided on each of the swatting surfaces 31,32 are a plurality of swatting sheets 40,41 which are detachably adhesively coupled to the adjacent swatting sheets of its respective plurality of swatting sheets 40,41. In particular, each swatting sheet 40,41 has a top surface 42,43 which is designed for striking an insect and a back surface 44,45 which preferably has an adhesive applied thereon for adhering to the top surface 42,43 of the adjacent swatting sheet of that plurality of swatting sheets 40,41. Like the handle member 20 and the swatting member 30, the swatting sheets 40,41 are preferably are substantially transparent. Similarly, it is preferably that the adhesive used on the back surfaces 44,45 of the swatting sheets also be substantially transparent.

With reference to FIGS. 2 and 3, each of the swatting sheets 40,41 have a lifting tab 46,47 for helping remove the top most sheet 40,41 from the stack of swatting sheets. The lifting tabs 46,47 are preferably positioned towards the proximal end 21 of the handle member 20 for helping convenient removal by a user of a swatting sheet by the tabs 46,47. Ideally, the back surfaces of the tabs 46,47 do not have an adhesive applied to them so that they be easily grasped by a used during removal of a swatting sheet 40,41. In this ideal embodiment, it is also preferred that the swatting sheets 40,41 are tapered towards their lifting tab 46,47.

In use, a user grasps the handle member 20 and swings the fly swatter towards an insect so that the swatting member 30 strikes the insect. The user may then peel off the top swatting sheet 40 by grasping the lifting tab 46 to clear the swatting member 30 of insect debris thereon.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fly swatter, comprising:

an elongate handle member having opposite proximal and distal ends;

a substantially planar swatting member being extended from said proximal end of said handle member, said swatting member having opposite substantially planar first and second swatting surfaces;

wherein said handle member and said swatting member are substantially transparent;

each said swatting surface of said swatting member having a plurality of swatting sheets thereon, each said swatting sheet having a top surface and a back surface, said back surface of each swatting sheet having an adhesive thereon, the swatting sheets of each said plurality of swatting sheets being adhesively coupled to the adjacent swatting sheets of said plurality of swatting sheets;

wherein said swatting sheets are substantially transparent;

wherein each said swatting sheet has a lifting tab, said lifting tabs of said swatting sheets being positioned towards said proximal end of said handle member; and wherein each said swatting sheet is tapered towards said lifting tab of said swatting sheet.

* * * * *